Figure 1:
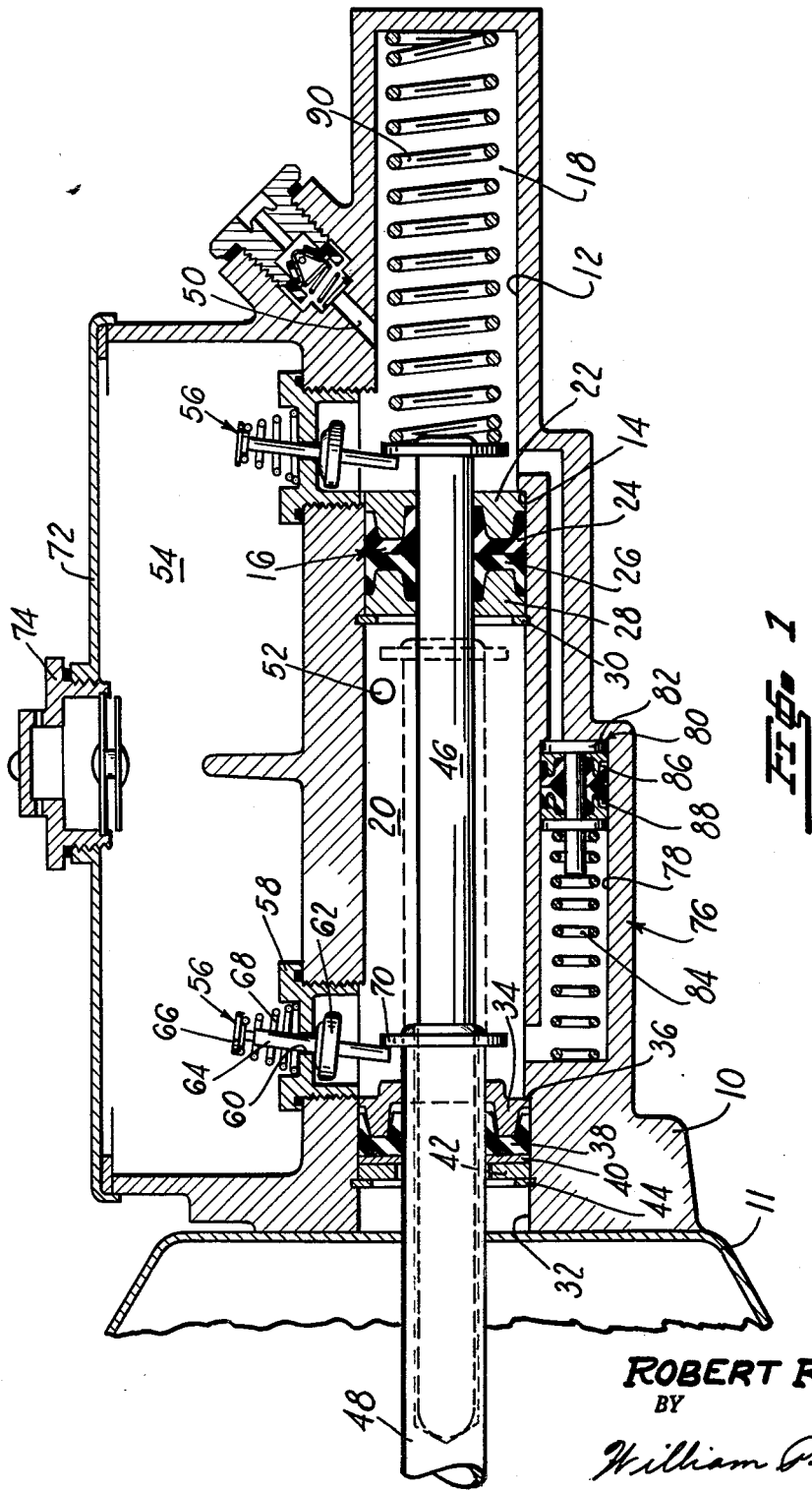

Jan. 22, 1963

R. R. HAGER 3,074,235

TANDEM MASTER CYLINDER

Filed Aug. 5, 1960

2 Sheets-Sheet 1

INVENTOR.
ROBERT R. HAGER
BY
William P. Hickey
ATTORNEY

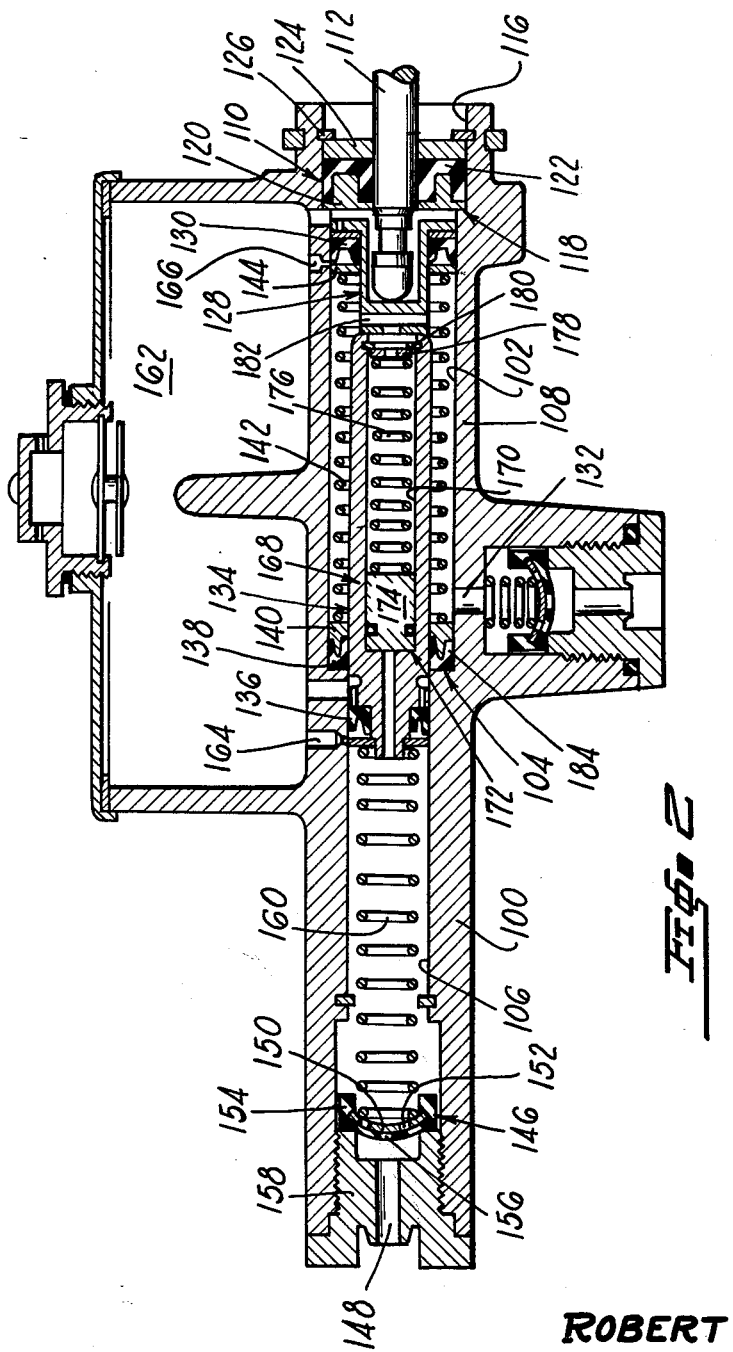

3,074,235
TANDEM MASTER CYLINDER
Robert R. Hager, South Bend, Ind., assignor to The Bendix Corporation, a corporation of Delaware
Filed Aug. 5, 1960, Ser. No. 47,820
4 Claims. (Cl. 60—54.6)

The present invention relates to multiple displacement master cylinders and the like; and more particularly to a new and improved design of multiple displacement master cylinder which will more adequately compensate for changes in fluid demand of the systems connected to its displacement chambers.

The principle object of the present invention is the provision of a new and improved multiple displacement master cylinder which is simple in design, more efficient in its operation and less expensive to manufacture than the prior art designs with which I am familiar.

The invention resides in certain constructions and combinations and arrangements of parts; and further objects and advantages of the invention will become apparent to those skilled in the art to which the invention relates from the following description of the preferred embodiments described with reference to the accompanying drawings forming a part of this specification, and in which:

FIGURE 1 is a cross sectional view of one form of master cylinder embodying principles of the present invention; and FIGURE 2 is a cross sectional view of another form of master cylinder embodying principles of the present invention.

The embodiment of master cylinders shown in FIGURE 1 generally comprises a housing 10 which is bolted to the front end of a fluid pressure servomotor 11 only a portion of which is shown in the drawing. The housing 10 has a longitudinally extending slightly stepped bore 12 therein providing a shoulder as at 14 against which suitable sealing means 16 is located to divide the bore 12 into front or inner, and rear or outer chambers 18 and 20 respectively. The seal 16 comprises an annular seal retainer 22 that is positioned against the shoulder 14, a cup-shaped seal 24 positioned against the retainer 22, another cup-shaped seal 26 positioned with its back against the cup-shaped seal 24, and another annular seal retainer 28 held in place by means of the snap ring 30. A similar seal is provided adjacent the rear end of the outer fluid displacement chamber 20, which seal also is seated in a slight counterbore 32 in the outer or rear end of the bore 12. The seal comprises a retainer 34 seated against the shoulder 36 formed by the counterbore 32, a cup-shaped seal 38, a spauldite washer 40, a back-up washer 42, all of which are held in place by means of the snap ring 44.

According to principles of the present invention, individual inner and outer fluid displacement members 46 and 48 are provided for the inner and outer chambers 18 and 20, respectively. The inner fluid displacement member 46 is a generally rod-shaped one which extends through the sealing means 16 into the outer chamber 20 so it is acted upon by the pressure generated in the outer chamber 20. The outer fluid displacement member 48 extends through the outer cup-shaped seal 38 and is of a larger displacement area than is the inner displacement member 46. According to further features of the invention the outer displacement member 48 is adapted to abut and drive the inner fluid displacement member 46; and in the preferred embodiment shown in FIGURE 1, the outer fluid displacement member 48 is drilled out to receive and thereby telescope over the end of the inner fluid displacement member 46. By means of this arrangement, a pair of simple axially aligned telescopic members are provided for displacing fluid from the respective chambers 18 and 20. The fluid displaced from the inner chamber 18 passes out through the outlet port 50, and the fluid displaced from the outer chamber 20 passes out through the outlet port 52.

In order to assure that the systems which are connected to the chambers 18 and 20 respectively are kept full of fluid even though leakage etc., should occur, a reservoir 54 for holding a supply of compensating fluid is formed integrally in the upper region of the housing 10 overlying portions of the chambers 18 and 20 respectively. Any suitable means of communicating this reservoir with the respective chambers may be used providing that the reservoir will be suitably valved off whenever the respective displacement members are forced into their respective fluid displacement chambers. In the embodiment shown in FIGURE 1, suitable tilt valve structures 56 are utilized similar to that shown and described in the Earl R. Price Patent No. 2,683,352. The tilt valve structures for each of the chambers 18 and 20 are identical and only one of which will be described in detail.

Each valve generally comprises a threaded body 58 which is threaded into an opening extending between the reservoir and the respective chamber, and the valve body 58 has a centrally located valve port 60 extending therethrough. A suitable poppet member 62 is provided for abutment against the inner face of the body member 58 surrounding the port 60, and the poppet member 62 is provided with a stem 64 which extends upwardly through the valve port 60. The upper end of the stem 64 terminates in a head 66, and a suitable coil spring 68 is provided between the head 64 and the top of the body member 58 to normally urge the valve closure member 62 up into engagement with the body member 58 surrounding the port 60. In order that the tilt valve 56 will be opened when the displacement members are in their retracted positions shown in the drawing, each of the displacement members are provided with a flange 70 which abuts the bottom end of the stem 64 which extends downwardly through the valve closure member 62. As the respective displacement members are moved to their normal positions shown in the drawing, the flanges 70 abut the bottom of the stem 64 and tilt the respective valves open. A suitable cover member 72 is provided for the reservoir 54, which cover member contains a filler cap 74 which can be removed to replenish fluid in the reservoir 54.

Structures built in accordance with the principles so far described will normally be used to actuate a pair of systems requiring amounts of fluid which are generally of a predetermined ratio to each other, as for example, the front and rear braking systems of an automotive vehicle. When the unit is designed to actuate the front and rear braking systems of a particular vehicle, it is desirable to proportion the displacement members 46 and 48 so that the displacement of each member approximately equals the fluid displacement required by its respective portion of the braking system which it actuates. Were the demand of the systems that are connected to the chambers 18 and 20 exactly equal, the displacement of the members 46 and 48 respectively, the outer end of the displacement member 46 will be abutted by the outer displacement member 48 throughout its stroke. If the ratio of the displacements of the systems which are connected to the chambers 18 and 20 changes so as to increase the amount of fluid required from the chamber 18 over and above the ratio for which the displacement members 46 and 48 were originally designed, actuation of the unit causes the inner fluid displacement member 46 to move out of engagement with the outer displacement member 48 so as to compensate for the increased demand in the system connected to the chamber 18. This occurs by the reason of the fact that the pressure which is generated in the outer chamber 20 is distributed across the end of the inner fluid displacement member 46 so as to force the inner fluid displacement member 46 into its bore until the pressure in the inner chamber 18 equals that in the chamber 20.

A further advantage occurs from the construction so far described by reason of the displacement of the inner member 46 being less than the displacement for the outer displacement member 48. Normally the pressure which is developed in the inner fluid displacement chamber 18 is approximately equal to that which is developed in the outer fluid displacement chamber 20. Should a failure occur in the system which is connected to the chamber 20 however, the force which is being applied to the outer displacement member 48 will now be entirely transmitted to the inner displacement member 46 by reason of its abutment therewith; and since the inner fluid displacement member 46 is of smaller diameter than the outer displacement member 48, a higher pressure will be generated in the inner chamber 18 than would normally be created. This feature has a particular advantage in the braking system of an automobile, since pressures greater than normal can then be generated to operate the portion of the system which is connected to the chamber 18.

It may sometimes occur that the wear in the portions of the braking systems which are connected to the chambers 18 and 20 may not take place evenly; and that therefore, the portion of the system which is connected to the chamber 20 may require a greater volume of fluid than would normally be produced by the fluid displacement member 48. It will be seen that should the pressure in the inner chamber 18 increase rapidly by reason of the system which is connected to its outlet port 50 "having gone solid," the outer displacement member 48 will be restrained against further inward movement. Where wear in the system which is connected to the chamber 20 has occurred to the point where the movement of the outer displacement member 48 that is permitted by inner displacement member 46 does not satisfy the fluid requirement in the system connected with the outer chamber 20, insufficient pressure will be generated in the outer chamber 20.

According to further principles of the invention, a one-way fluid compensating device 76 is provided which will take fluid displacement out of the inner fluid displacement chamber 18 and add it to that of the outer fluid displacement member 20. The one-way fluid compensating device 76 shown in the drawing generally comprises a stepped bore 78 providing a shoulder 80 against which a piston or movable wall 82 is normally held by means of a coil spring 84. The piston has oppositely facing cup seals 86 and 88 which slidingly engages the bore 78 to prevent flow of fluid past the piston 82. The pressure in the inner chamber 18 never appreciably exceeds the pressure in the outer fluid chamber 20, inasmuch as the piston 82 is free to compress the light coil spring 84 thereby decreasing the pressure in the chamber 18 and increasing the pressure in the outer chamber 20.

As previously described the inner and outer fluid displacement member 46 and 48 will normally be proportioned to approximately equal the displacements required in the systems connected to their respective chambers 18 and 20. When the outer displacement member 48 is moved inwardly, by the servomotor attached to the unit, the displacement members 46 and 48 will move into their respective chambers 18 and 20 by approximately equal distances so that the member 46 will normally stay in abutment with the outer displacement member 48. If, however, the requirement of the system connected to the chamber 18 has increased so that a greater amount of fluid is required than would normally be provided, separation of the inner displacement member 46 from the outer displacement member 48 takes place to automatically compensate by an amount necessary to meet the increased demand on the chamber 18. If, however, the amount of fluid required by the system connected to the chamber 20 has increased above its normal demand, the inner fluid displacement member 46 stays in abutment with the outer fluid displacement member 48, and the necessary additional quantity of fluid is supplied by reason of the one-way fluid compensating device 76.

When it is desired to release the pressure in the systems connected the chambers 18 and 20, fluid pressure in the chambers causes the inner and outer fluid displacement members 46 and 48 to move outwardly. In order to assure that the inner displacement member 46 stays in abutment with the outer displacement member 48, a coil spring 90 is provided between the inner end of the chamber 18 and the inner fluid displacement member 46. As the fluid displacement members 46 and 48 approach the outer limit of their strokes, the washers 70 engage the bottom end of the stems 64 of their respective tilt valve assemblies 56, to tilt the valve closure members 62 out of sealing engagement with their valve bodies 58 to communicate the reservoir 54 with the respective chambers 18 and 20 and thereby make up for any deficiency or excess of fluid in the respective chambers.

FIGURE 2 of the drawing shows a different arrangement which also embodies certain principles of the present invention. The master cylinder shown in FIGURE 2 generally comprises a housing 100 having a longitudinally extending stepped bore 102 providing the shoulder 104. The inner small diameter portion 106 of the bore 102 provides one fluid displacement chamber of the master cylinder shown, and the outer large diameter portion 108 provides the other fluid displacement chamber of the master cylinder. The outer end of the outer portion 108 is provided with an annular sealing structure 110 through which a push rod 112 extends for actuating the unit. The sealing structure 110 is fitted into a slight counterbore 116 in the outer end of the portion 108 to provide a shoulder 118 against which an annular seal retainer 120 is positioned for supporting the inwardly projecting lips of an annular cup seal 122. The seal 122 is held in place by means of an annular back-up washer 124 which in turn is held in the bore by means of a snap ring 126. The inner end of the push rod 112 is received in a piston 128 having an annular cup-shaped seal 130 in its outer periphery for displacing fluid out of the outer fluid displacement chamber 108 through its outlet port 132.

Fluid is adapted to be forced out of the inner fluid displacement chamber 106 by a generally cylindrically shaped piston or inner fluid displacement member 134 having an annular cup-shaped seal 136 in its outer periphery which slidingly sealingly engages the sidewalls of the inner bore portion 106. The piston 134 is of such a length that the seal 136 is retained in the inner bore 106 when the outer end of the piston 134 engages the outer piston 128 when it is in its retracted position. A suitable seal between the chambers 106 and 108 is provided by an annular cup seal member 138 which is positioned against the shoulder 104 between the bores, and which is held in place by the retainer 140 and coil spring 142. The outer end of the coil spring 142 is positioned against another retainer 144 that is used to hold the seal 130 in position.

Fluid which is displaced from the inner chamber 106 passes out through a conventional residual pressure check valve structure 146 through the outlet port 148 and thence to the system to which it is connected. The residual pressure check valve 146 generally comprises a disk-shaped metallic member 150 having a plurality of holes 152 spaced laterally from its center, and a rubber membrane 154 which is stretched over its outer surface and retained on the disk 150 by means of a thickened outer periphery which is snapped over the outer edge of the disk-shaped member 150. The membrane 154 has an opening 156 therethrough which is not aligned with the holes 152, so that fluid which passes through the holes 152 pushes the membrane away from the disk 150 and then passes out through the central opening 156 of the membrane to the outlet port 148. The outlet port 148 is formed in an outlet port fitting 158 which is screwed into the inner end of the bore 106 to provide a shoulder against which the residual pressure check valve 146 abuts; and the check valve structure is normally biased into sealing engagement therewith by means of a coil spring 160 that is positioned between the disk 150 and the inner fluid displacement member 134. Return flow through the port 148 will bias the check valve structure 154 out of engagement with the fitting 158 and thereby flow around its outer periphery. A certain amount of pressure is held in the port 148 by reason of the force of the coil spring 160. The outlet port 132 for the outer chamber 108 is provided with a similar residual pressure check valve structure which is constructed and operates in an identical manner to that above described.

The structure so far described functions generally in the same manner as that described for the embodiment shown in FIGURE 1; and the bores 106 and 108 are generally so proportioned as to provide substantially the same ratio of displacement as that required in the systems connected to the outlet ports 148 and 142 respectively. This being true, the outer piston 128 normally stays in engagement with the inner piston 134 so that the two move down their bores simultaneously. If however, a greater demand for fluid is experienced in the inner chamber 106 than would normally be required, pressure in the outer chamber 108 will separate the pistons to supply the increase in displacement of the system connected to the inner chamber 106.

In order that the fluid in the inner and outer chambers 106 and 108 can be replenished should loss occur, a reservoir 162 is provided in the region above the portions of the respective chambers; and suitable fluid compensating ports 164 and 166 are provided between the reservoir 162 and the respective bores immediately inwardly of the normal retracted position of the seals 136 and 130. Inward movement of the push rod 112 therefore causes the seals 130 and 136 to simultaneously move over their respective compensating ports, and thereby close off the reservoir 162 from the respective chambers with a minimum of movement of the push rod 112. Thereafter, further inward movement of the push rod 112 is free to generate pressure in the respective chambers in the manner above described, and thereby displace fluid out through their respective outlet ports 148 and 142.

The embodiment shown in FIGURE 2 operates generally in the same manner as that described for the embodiment shown in FIGURE 1; and it is intended that the outer piston 128 will stay in engagement with the inner piston 134 during normal operation. If, however, the amount of fluid required by the system connected to the outer chamber 108 should for some reason increase so that simultaneous movement of the pistons 128 and 134 cannot properly supply the system connected to the outer chamber 108 before the inner bore 106 "goes solid," a one-way fluid compensating device 168 is provided. The one-way fluid compensating device 168 is formed by means of an axially extending stepped bore 170 in the inner fluid displacement member 134 which provides a shoulder 172 against which a compensating piston 174 is normally biased by means of a coil spring 176. The opposite end of the coil spring 176 is positioned against an annular washer 178 held in the outer end of the bore 170 by means of a snap ring 180, so that fluid pressure from the outer fluid displacement chamber 108 is always exerted against the outer end face of the piston 174. In order that the outer end of the bore 170 will not be sealed off by the abutment of the outer fluid displacement member 128 therewith, suitable passageways 182 are provided in the abutting end section of the displacement member 128 to at all times communicate the outer displacement chamber 108 with the outer end of the bore 170. The opposite or small diameter bore section of the bore 170 is at all times in communication with the inner fluid displacement chamber 106, so that the pressures in the chambers 106 and 108 are at all times exerted upon opposite end faces of the compensating piston 174. A suitable O-ring seal 184 is provided in the outer periphery of the piston 174 to effectively seal off communication between the chambers 106 and 108. The coil spring 176 is a comparatively light spring, so that whenever the pressure in the inner fluid displacement chamber 106 appreciably exceeds the pressure in the chamber 108, the compensating piston 174 will move outwardly to equalize the pressures in the two chambers. If on the other hand, the pressure in the chamber 108 should exceed the pressure in the chamber 106, the pressure in chamber 108 causes the end of the inner fluid displacement member 134 to separate from the outer fluid displacement member 128 and thereby substantially equalize the pressure in the two chambers.

It will be seen that the objects heretofore enumerated as well as others have been accomplished, and that there has been provided a simplified design of a multiple displacement master cylinder which utilizes a one-way drive between the displacement members of the unit to compensate for an increased fluid demand of one of the sections of the master cylinder, and includes a one-way fluid compensating device for compensating for an increase in fluid demand of the other section of the master cylinder. It will further be seen that a simplified arrangement is also provided for simultaneously closing the fluid compensating ports of each chamber with a minimum of actuating movement.

While the invention has been described in considerable detail, I do not wish to be limited to the particular constructions shown and described; and it is my intention to cover hereby all adaptations, modifications and arrangements thereof which come within the practice of those skilled in the art to which the invention relates.

I claim:

1. A master cylinder and the like comprising: a housing having axially aligned front and rear fluid displacement chambers, first and second fluid displacement members for respective front and rear fluid displacement chambers, said first displacement member extending into said rear chamber for abutment by said second displacement member to provide a one-way drive therebetween, with said first fluid displacement member being unrestrained against forward movement by said second fluid displacement member, and with the fluid pressure of said rear fluid displacement chamber being exerted against said first fluid displacement member to drive said first fluid displacement member into said front fluid displacement chamber, and means urging said first displacement member into abutment with said second displacement member and causing both members to assume normal positions adjacent the rear ends of their respective chambers, and the displacement of said second fluid displacement member being greater than said first fluid displacement member to normally cause separation of said fluid displacement members during forward movement of said second fluid displacement member.

2. A master cylinder and the like comprising: a housing having axially aligned front and rear fluid displacement chambers, first and second fluid displacement members for respective front and rear fluid displacement chambers, said first displacement member extending into said rear chamber for abutment by said second displacement member to provide a one-way drive therebetween, with said front fluid displacement member being unrestrained against forward movement by said rear fluid displacement member, and with the fluid pressure of said rear fluid displacement chamber being exerted against said front fluid displacement member to drive said front fluid displacement member into said front fluid displacement chamber, and means urging said first displacement member into abutment with said second displacement member and causing both members to assume normal positions adjacent the rear ends of their respective chambers, fluid compensating means for respective chambers each adapted to be opened when said displacement members are in their normal position and to be closed when said displacement members are moved forwardly of their normal positions, the displacement of said second fluid displacement member being greater than said first fluid displacement member to normally cause separation of said fluid displacement members during forward movement of said second fluid displacement member means forming a compensating chamber opposite ends of which communicate with respective front and rear fluid displacement chambers, a movable wall in said compensating chamber, stop means limiting movement of said movable wall toward the end of said compensating chamber which communicates with said front fluid displacement chamber, and means normally biasing said movable wall into engagement with said stop means.

3. A master cylinder and the like comprising: a housing having axially aligned front and rear fluid displacement chambers, sealing means separating said front and rear chambers, an axially positioned front fluid displacement member for said front chamber extending through said sealing means into said rear chamber, an axially positioned rear fluid displacement member for said rear chamber, said rear member being telescoped over the end of said front member for abutment therewith to provide a one-way driving connection therebetween in which the fluid pressure generated in said rear chamber is exerted against said front fluid displacement member, said front displacement member being unrestrained against forward movement by said rear displacement member, means urging said front displacement member into abutment with said rear displacement member and causing both members to assume normal positions adjacent the rear ends of their respective chambers, and fluid compensating means for respective chambers each adapted to be opened when said displacement members are in their normal position and to be closed when said displacement members are moved inwardly of their normal positions, whereby both compensating means are closed with a minimum of movement of said outer fluid displacement member.

4. A master cylinder and the like comprising: a housing having axially aligned front and rear fluid displacement chambers, sealing means separating said front and rear chambers, an axially positioned front fluid displacement member for said front chamber extending through said sealing means into said rear chamber, an axially positioned rear fluid displacement member for said rear chamber, said rear member being telescoped over the end of said front member for abutment therewith to provide a one-way driving connection therebetween in which the fluid pressure generated in said rear chamber is exerted against said front fluid displacement member, said front displacement member being unrestrained against forward movement by said rear displacement member, means urging said front displacement member into abutment with said rear displacement member and causing both members to assume normal positions adjacent the rear ends of their respective chambers, fluid compensating means for respective chambers each adapted to be opened when said displacement members are in their normal position and to be closed when said displacement members are moved forwardly of their normal positions, means forming a compensating chamber opposite ends of which communicate with respective front and rear fluid displacement chambers, a movable wall in said compensating chamber, stop means limiting movement of said movable wall toward the end of said compensating chamber which communicates with said front fluid displacement chamber, and means normally biasing said movable wall into engagement with said stop means.

References Cited in the file of this patent
UNITED STATES PATENTS

| Re. 19,432 | Carroll | Jan. 22, 1935 |
| 2,074,416 | Oliver | Mar. 23, 1937 |
| 2,253,240 | Loweke | Aug. 19, 1941 |